United States Patent [19]

Honaga et al.

[11] Patent Number: 4,605,085
[45] Date of Patent: Aug. 12, 1986

[54] POWER STEERING

[75] Inventors: Susumu Honaga, Aichi; Mikio Suzuki, Hekinan, both of Japan

[73] Assignee: Toyoda Koki Kabushiki Kaisha, Kariya, Japan

[21] Appl. No.: 724,920

[22] Filed: Apr. 19, 1985

[30] Foreign Application Priority Data

Apr. 23, 1984 [JP] Japan .................. 59-82732

[51] Int. Cl.$^4$ .............................................. B62D 5/06
[52] U.S. Cl. ..................................... 180/143; 180/141
[58] Field of Search ............. 180/143, 132, 141, 142, 180/147, 148; 91/434, 371, 372

[56] References Cited

U.S. PATENT DOCUMENTS 2,917,938 12/1959 Folkerts ............................ 180/147
4,311,161 1/1982 Narumi ............................. 180/143

FOREIGN PATENT DOCUMENTS 0094855 7/1980 Japan ................................ 180/141
56-148974 11/1981 Japan .
57-186579 11/1982 Japan .
1035686 7/1966 United Kingdom ................ 180/147

Primary Examiner—John J. Love
Assistant Examiner—Mark Dukes
Attorney, Agent, or Firm—Oblon, Fisher, Spivak, McClelland & Maier

[57] ABSTRACT

A power steering, comprising: a pump driven from an engine; a flow control valve for regularizing the discharge rate of the pump varying in response to the rotational speed of the engine; a power cylinder; a distribution control valve for distributing a regularized fluid pressure from the flow control valve to opposite fluid chambers of the power cylinder; a sector gear meshed with a rack formed on the piston of the power cylinder and rotatable by operation of the power cylinder; a sector shaft having the sector gear formed integrally therewith and displaceable in the axial direction for adjusting the preload on the meshed rack and sector gear; a preload control cylinder for axially displacing the sector shaft, the preload control cylinder including a piston connected to the sector shaft and having different pressure receiving areas on the axially opposite ends thereof; a first fluid passage for conducting part of the pressurized fluid being sent from the pump to said flow control valve, to one of fluid chambers defined in the preload control cylinder by the piston; and a second fluid passage for conducting part of the pressurized fluid being fed from the flow control valve to the distribution control valve to the other fluid chamber in the preload control cylinder.

4 Claims, 4 Drawing Figures

POWER STEERING

BACKGROUND OF THE INVENTION

1. Field of the Invention

This invention relates to a power steering mechanism which is adapted to control the required steering force by variably controlling the preload on rack teeth formed on a piston of a power cylinder and a sector gear formed on a sector shaft and meshed with the rack teeth.

2. Description of the Prior Art

Generally, a ball screw type steering mechanism includes a screw shaft, a ball nut mounted on the screw shaft through balls, and a sector shaft with a sector gear meshed with rack teeth formed on the ball nut. The conventional power steering mechanism of this sort has a function of responding to the vehicle speed, displacing the sector shaft in the axial direction by operation of a cylinder according to the vehicle speed thereby to control the preload on the rack teeth and sector gear in response to the vehicle speed. Namely, the preload is reduced to provide light steering in low speed operations of the vehicle and the preload is increased to provide heavy steering in high speed operations.

Accordingly, the conventional powering steering mechanisms have a drawback that the steering wheel becomes heavier in operation in high speed running of a vehicle.

SUMMARY OF THE INVENTION

It is therefore an object of the present invention to provide an improved power steering mechanism which is capable of controlling the steering force according to the vehicle speed and reducing the steering force when a steering wheel is turned even in high speed operations.

Briefly stated, the power steering mechanism according to the present invention employs, for displacing a sector shaft in the axial direction, a cylinder having a piston with different pressure receiving areas on at opposite ends thereof, supplying one of cylinder chambers defined by the piston with a fluid pressure sent from the discharge side of a pump, while supplying the other cylinder chamber with a pressurized fluid being led to a distribution control valve through a throttle of a flow control valve.

According to the invention, there is provided a power steering, comprising in combination: a pump driven from an engine; a flow control valve for regularizing the discharge rate of a pressurized fluid from the pump operating in response to the rotational speed of the engine; a power cylinder; a distribution control valve for distributing the regularized fluid pressure from said flow control valve to opposite fluid chambers of the power cylinder; a sector gear meshed with a rack formed on the piston of the power cylinder and rotatable by operation of the power cylinder; a sector shaft having the sector gear formed integrally therewith and displaceable in the axial direction for adjusting the preload on the meshed rack and sector gear; a preload control cylinder for axially displacing the sector shaft, the preload control cylinder including a piston connected to the sector shaft and having different pressure receiving areas on the axially opposite ends thereof; a fluid passage for conducting part of the pressurized fluid being sent from the pump to the flow control valve to one of fluid chambers defined in the preload control cylinder by the piston; and a fluid passage for conducting part of the pressurized fluid being sent from the flow control valve to the distribution control valve to the other one of the cylinder chambers of the preload control cylinder.

The above and other objects, features and advantages of the invention will become apparent from the following description and appended claims, taken in conjunction with the accompanying drawings which show by way of example preferred embodiments of the invention.

DETAILED DESCRIPTION OF A PREFERRED EMBODIMENT

Figure 1:
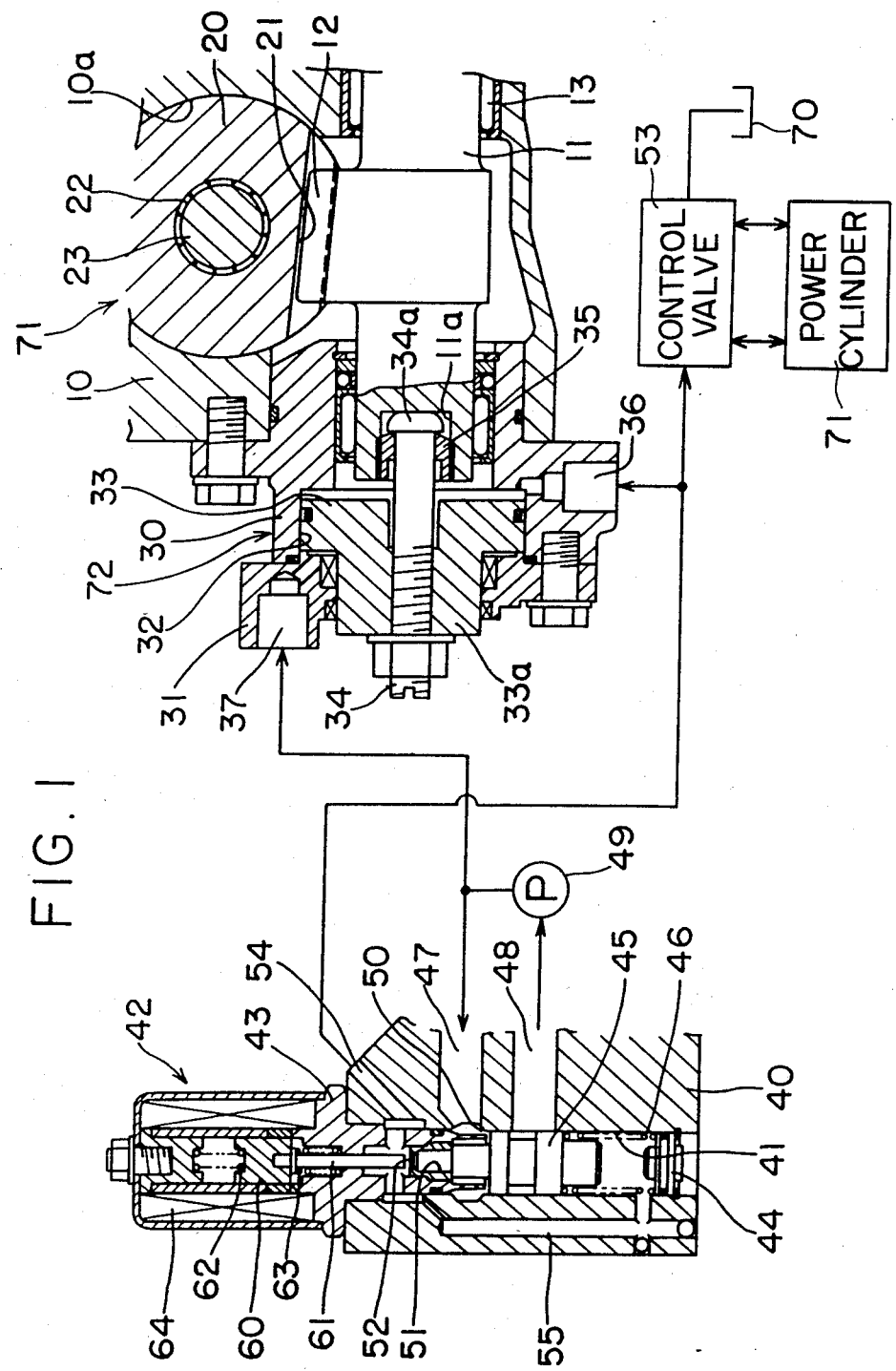
FIG. 1 is a diagrammatic sectional view of a power steering mechanism according to the invention, showing major components thereof.

Referring to FIG. 1, a numeral 10 denotes a gear housing in which a sector shaft 11 is rotatably and axially movably supported by a bearing 13. The sector shaft 11 is formed thereon with a sector gear 12, whose teeth are inclined at a predetermined angle with respect to the axis of the sector shaft 11.

The gear housing 10 is internally formed with a cylinder chamber 10a, which slidably receives therein a piston 20 for movements in a direction perpendicular to the axis of the sector shaft 11. This piston 20 is formed at the mid portion of its length with rack teeth 21 meshing with the aforementioned sector gear 12. A screw shaft 23 is threaded into the center portion of the piston 20 through balls 22, and one end of the screw shaft 23 is connected to a steering wheel, not shown, through a distribution control valve 53.

A cylinder block 30 which is fixed to the gear housing 10 has an end cover 31 fixedly secured thereto. A piston 33 is slidably fitted in a cylinder chamber 32, which is defined by the cylinder block 30 and end cover 31, for sliding movement in the axial direction of the sector shaft 11. The piston 33 is centrally provided with a small-diameter portion 33a which is projected in a direction away from the sector shaft 11 and into which one end of an adjusting screw shaft 34 is threaded coaxially with the piston 33. The adjusting screw shaft 34 is provided with a bulged head portion 34a at the other end, which end is fitted into a bore 11a at the opposing end of the sector shaft 11 and fixed to the latter by threading a fixing screw 34 into a tapped portion of the bore 11a. A cylinder device 72 is constituted by the cylinder block 30, end cover 31, cylinder chamber 32, piston 33 and adjusting screw 34. Since the piston 33 of the cylinder device 72 is provided with a small-diameter portion 33a, it has different pressure receiving areas on opposite sides thereof, that is to say, it has a larger pressure receiving area on the side of the sector shaft 11 as compared with that on the side of the end cover 31. Further, the small-diameter portion 33a is so formed as to have a larger diameter than the end of the sector shaft 11 on the side of the piston.

The cylinder block 30 is provided with a first inlet port 36 for supplying from outside a pressurized fluid into the cylinder chamber 32 on the side of the sector shaft 11, while the end cover 31 is provided with a second inlet port 37 for supplying from outside a pressurized fluid into the cylinder chamber 32 on the side of the small-diameter portion 33a.

Designated at 40 is a valve housing which has a valve receiving bore 41 formed therethrough. A valve body of a solenoid valve 42 is fixedly fitted at one end of the valve receiving bore 41, and a plug 44 is fixed at the other end of the valve receiving bore 41. A flow control spool 45 is slidably fitted in the valve receiving bore 41 between the valve body 45 and plug 44, and a spring 46 is interposed between the plug 44 and flow control spool 45, resiliently urging one end of the flow control spool 45 into abutting engagement with the valve body 43.

The valve housing 40 is provided with a supply passage 47 and a bypass passage 48 in communication with the valve receiving bore 41 and in spaced positions in the axial direction of the flow control spool 45. The supply passage 47 is communicated with the delivery side of a pump 49, while the bypass passage 48 is communicated with the suction side of the pump 49. An annular fixed orifice is provided between the outer periphery of the inner end of the valve body 43 and the valve receiving bore 41, so that a pressure differential occurs between the upstream and downstream sides of the fixed orifice 50 when the pressurized fluid flows therethrogh. The valve body is internally provided with a passage 51 in communication with the valve receiving bore 41 on the side of the flow control spool 45, the passage 51 being formed with a throttle passage 51 within the length thereof. The valve housing 40 is provided with a delivery passage 54 for conducting the pressurized fluid to the control valve 54 after constriction through the throttle passage 52, and with a communication passage 55 for conducting the pressurized fluid from the throttle valve 52 to the valve receiving bore 41 on the side of the spring 46. Consequently, the fluid pressures on the upstream and downstream sides of the throttle passage 52 act on the flow control spool 45, moving same in the axial direction according to the pressure differential to adjust the open area of the bypass passage 48.

The solenoid valve 43 includes a valve body 43, a plunger 60 slidable in the axial direction of the flow control spool 45, a rod 61 fixed to the plunger 60, springs 62 and 63 balancing the plunger 60 in the axial direction of the flow control spool 45, and a solenoid 64 actuatable to attract the plunger 60 toward the valve body 43.

With regard to the operation of the solenoid valve 42, the open area of the throttle passage 52 is variably controlled through axial movements of the rod 61 which is displaced in the axial direction as current is applied to the solenoid 64. In this instance, the solenoid 64 is applied with a current commensuate with the vehicle speed, and the flow control spool 45 opens the bypass passage 48 according to the pressure differential across the throttle passage 52, supplying the pressurized fluid to the afore-mentioned distribution valve (hereinafter referred to simply as "control valve" for brevity) at a flow rate responsive to the vehicle speed. The pressurized fluid after constriction through the throttle passage 52 is led to the first inlet port 36 on the way to the control valve 53, while the pressurized fluid delivered from the pump 49 is led to the second inlet port 37 on the way to the supply passage 47.

The fluid which fed to the control valve 53 is returned to a reservoir 70 when the steering wheel is in neutral position, so that the fluid pressure which is led to the first inlet port 36 becomes close to the reservoir pressure. If the steering wheel is turned, the fluid passage which leads from the delivery passage 54 to the reservoir 70 is constricted, raising the fluid pressure to the first inlet port 36. At this time, the pressurized fluid from the delivery passage 54 is supplied to one cylinder chamber 10a which is defined by the piston 20 of the power cylinder 71, and the fluid in the other cylinder chamber 10a is returned to the reservoir 70.

The pump 49 is driven by engine rotation, feeding the pressurized fluid to the supply passage 47 at a higher flow rate as the rotational speed N of the engine is increased. An increase of the flow rate of the fluid to the supply passage 47 causes a corresponding increase in the pressure differential across the fixed orifice 50.

Figure 2:
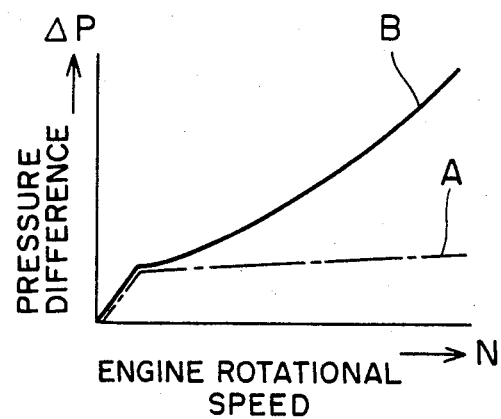
FIG. 2 is a graph showing the pressure differential P between the upstream side of an orifice 50 and the downstream said of an orifice 52 shown in FIG. 1, in a relation with the rotational speed N of the engine.

As indicated by a chain line A in FIG. 2, the pressure differential $\Delta P$ across the throttle passage 52 is maintained at a constant level irrespective of the rotational speed N of the engine. In FIG. 2, the solid line B shows the pressure differential $\Delta P$ between the upstream side of the fixed orifice 50 and the downstream side of the throttle passage 52 in relation with the rotational speed N of the engine.

The preload is applied on the rack teeth 21 and sector gear 12 in the following manner. After assembling the sector shaft 11 and piston 20, blocking sliding movements of the piston 33 toward the end cover 31, the adjusting shaft 34 is turned to protrude its bulged head portion 34a toward the sector shaft 11 to apply thereto a force which tends to push the sector shaft 11 in a rightward direction in FIG. 1, thereby setting the initial load of the assembling stage. The pressurized fluid delivered from the pump 49 acts on the left end face of the piston 33, urging the sector shaft 11 in a rightward direction in the drawing. The fluid from the delivery passage 54 acts on the left end face of the sector shaft 11 confronting the piston 33, urging the sector shaft in a rightward direction, and at the same time on the right end face of the piston 33, urging same in a leftward direction. The sector shaft 11 is thus subject to the balance of these forces. If the initial load in the assembling stage is Fo, the diameter of the piston 33 is d1, the diameter of the small-diameter diameter portion is d2, the diameter of the sector shaft 11 is d3, the pressure differential across the fixed orifice 50 is $\Delta p$, and the pressure downstream of the throttle passage 52 is P, the preload F is expressed as follows.

$$F = \pi/4(d1^2 - d2^2)\Delta P - \pi/4(d2^2 - d3^2)P + Fo \qquad (1)$$

Figure 3:
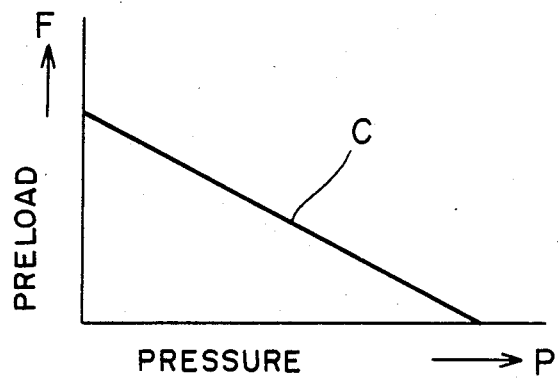
FIG. 3 is a graph showing the pressure P on the downstream side of the orifice 52 in relation to the preload.

In this instance, since the diameters d2 and d3 are arranged to be d2>d3, the preload F can be reduced along line C of FIG. 3 by increasing the pressure P downstream of the throttle passage 52 while maintaining a constant pressure differential $\Delta P$ between the upstream side of the fixed orifice 50 and the downstream side of the throttle passage 52.

The preload F is varied according to the Eq. (1) in the manner as follows. When the engine is operating at a low rotational speed and the steering wheel is in a straight-forward position with the pressure P downstream of the throttle passage 52 almost at zero level, the fluid is delivered from the pump 49 at a small flow rate and the pressure differential ΔP between the upstream side of the fixed orifice 50 and the downstream side of the throttle passage 52 is small. Therefore, the preload on the sector gear 21 and rack teeth 21 is small to provide light steering.

If the rotational speed of the engine is increased with the steering wheel in a straight-forward position, that is to say, with the pressure P downstream of the throttle passage 52 nearly at zero level, the fluid is delivered from the pump 49 at a higher flow rate, gradually increasing the pressure differential ΔP between the upstream side of the fixed orifice 50 and the downstream side of the throttle passage 52. As a consequence, the preload on the sector gear 12 and rack teeth 21 is increased to provide heavy steering, thereby improving the steering stability in a high speed operation of the vehicle when the engine is at a high rotational speed.

If the steering wheel is turned during a high speed operation, the passage for the fluid to be returned to the reservoir 70 from the delivery passage 54 is constricted, as a result increasing the pressure of the fluid sent out from the delivery passage 54, namely, the pressure P downstream of the throttle passage 52. Consequently, the preload on the sector gear 12 and rack teeth 21 is lessened to permit light steering.

If the steering wheel is returned to a straight ahead position, the pressure of the fluid which is sent to the control valve 53 from the delivery passage 54 drops to a level close to the reservoir pressure, whereby the preload on the sector gear 12 and the rack teeth 21 is restored to reinstate heavy steering.

Figure 4:
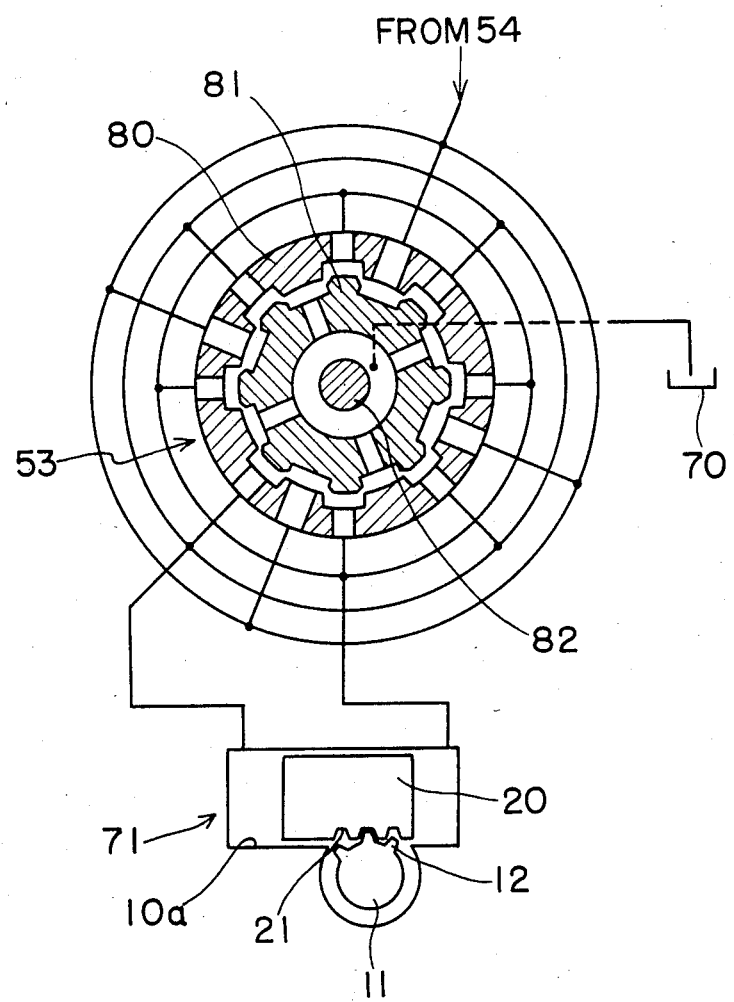
FIG. 4 is a schematic view of the parts shown by block diagram in FIG. 1.

Referring now to FIG. 4, the control valve 53 is exemplified as a rotary servovalve including a valve sleeve 80 and a rotor 81 rotatably carried therein. The valve sleeve 80 is rotatable bodily with the screw shaft 23, while the rotor 81 is rotatable bodily with the steering wheel. The steering wheel is connected to the screw shaft 23 through a torsion bar 82. When the steering wheel is in a neutral position, the rotary servovalve 53 permits the fluid from the delivery passage 54 to flow into the reservoir 70 without heightening the pressure of the fluid. However, when the steering wheel is turned in either direction, relative rotation is given between the valve sleeve 80 and the rotor 81. This causes the fluid from the delivery passage 54 to be heightened in pressure and to be delivered to one of chambers defined by the piston 20 of the power cylinder 71. This further causes the fluid in the other chamber of the power cylinder 71 to be exhaused to the reservoir 70. Consequently, the piston 20 in the power cylinder 71 is moved in response to the pressurized fluid acting thereon to assist the turning of the steering wheel by the driver.

As clear from the foregoing description, the present invention employs a cylinder with a piston which has different pressure receiving areas on the opposite sides thereof, for axially displacing a sector shaft. One of the cylinder chambers defined by the piston is supplied with the pressurized fluid which is led from the delivery side of a pump to a flow control valve, while the other cylinder chamber is supplied with the pressurized fluid which is led to a control valve through a throttle of the flow control valve. Consequently, it is possible to control the steering force in accordance with the vehicle speed and to reduce the steering force requried to the driver when the steering wheel is turned.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering, comprising:
   a pump driven from an engine;
   a flow control valve for regularizing the discharge rate of said pump varying in response to the rotational speed of an engine;
   a power cylinder;
   a distribution control valve for distributing a regularized fluid pressure from said flow control valve to opposite fluid chambers of said power cylinder;
   a sector gear meshed with a rack formed on the piston of said power cylinder and rotatable by operation of said power cylinder;
   a sector shaft having the sector gear formed integrally therewith and displaceable in the axial direction for adjusting the preload on the meshed rack and sector gear;
   a preload control cylinder for axially displacing said sector shaft, said preload control cylinder including a piston connected to said sector shaft and having different pressure receiving areas on the axially opposite ends thereof;
   a first fluid passage for conducting part of the pressurized fluid, which is sent from said pump to said flow control valve, to one of fluid chambers defined in said preload control cylinder by said piston; and
   a second fluid passage for conducting part of the pressurized fluid, which is fed from said flow control valve to said distribution control valve, to the other fluid chamber in said preload control cylinder.

2. The power steering of claim 1, further comprising a link rod connecting said sector shaft to said piston of said preload control cylinder.

3. The power steering of claim 2, wherein said link rod is threaded into one of said sector shaft and said piston of said preload control cylinder to permit relative axial positions thereof.

4. The power steering of claim 1, further comprising a solenoid valve for changing operating characteristics of said flow control valve in cooperation therewith.

* * * * *